UNITED STATES PATENT OFFICE.

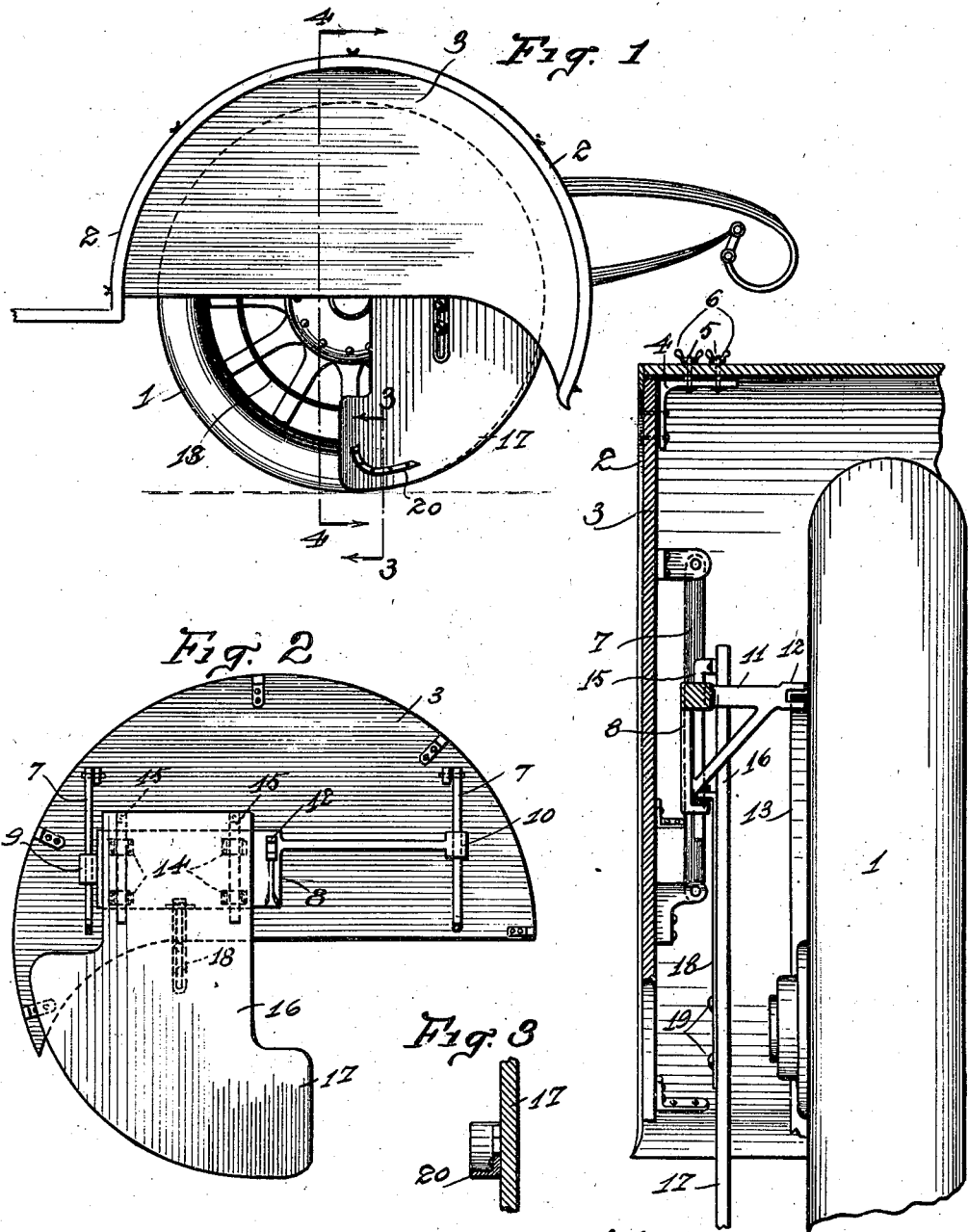

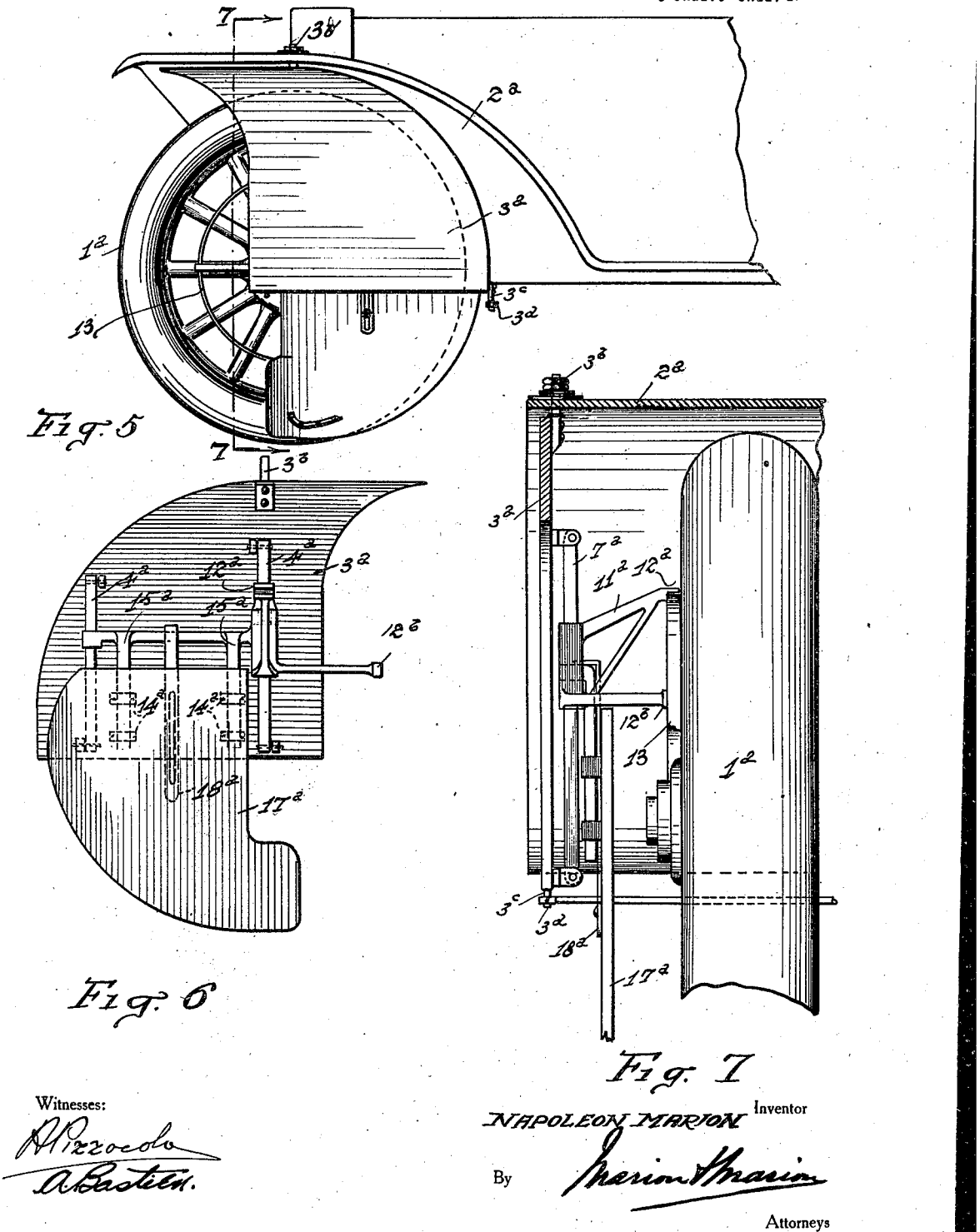

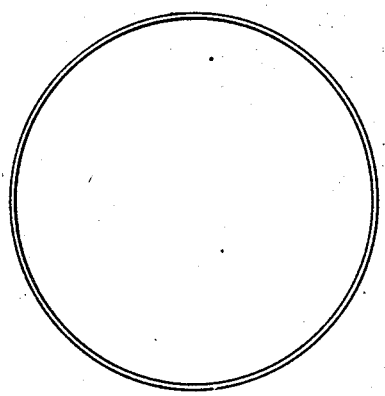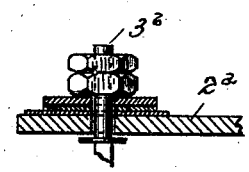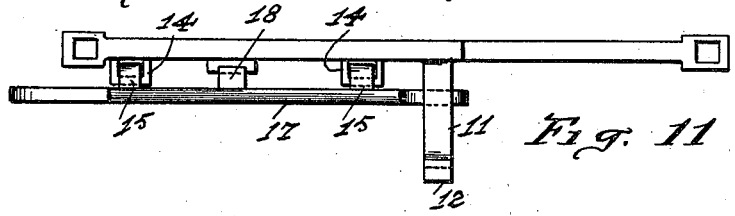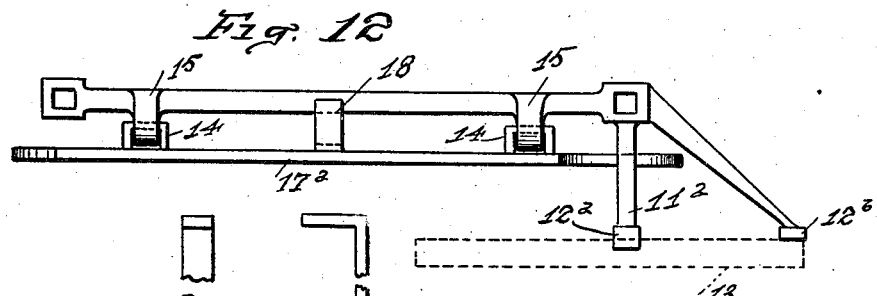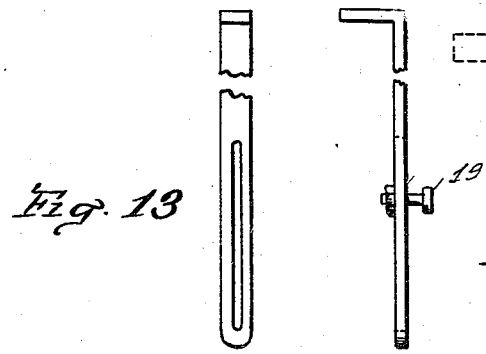

NAPOLEON MARION, OF MONTREAL, QUEBEC, CANADA.

MUD-GUARD FOR AUTOMOBILES AND THE LIKE.

1,147,256.   Specification of Letters Patent.   Patented July 20, 1915.

Application filed July 20, 1914. Serial No. 851,941.

*To all whom it may concern:*

Be it known that I, NAPOLEON MARION, a subject of the King of Great Britain, residing at 4636 Notre Dame street east, Montreal, Province of Quebec, Canada, have invented certain new and useful Improvements in Mud-Guards for Automobiles and the like; and I do hereby declare that the following is a full, clear, and exact description of the invention, such as will enable others skilled in the art to which it appertains to make and use the same.

The invention to be hereinafter described relates to mud guards for automobiles and the like.

In order to more clearly disclose the construction, operation, and use of the invention, reference should be had to the accompanying drawings forming part of the present application.

Throughout the several figures of the drawings like reference characters designate the same parts.

In the drawings: Figure 1 is a side view of the guard as applied to the back wheel of an automobile; Fig. 2 is an inside view of the guard used for a back wheel; Fig. 3 is a section on line 3—3 of Fig. 1 looking in the direction of the arrows; Fig. 4 is a section on line 4—4 of Fig. 1 looking in the direction of the arrows; Fig. 5 is a side view of the device as applied to the front wheel of an automobile; Fig. 6 is an inside view of the guard used for a front wheel; Fig. 7 is a section on line 7—7 of Fig. 5 looking in the direction of the arrows; Fig. 8 is a side view of the guard plate positioning ring; Fig. 9 is a front view of the same; Fig. 10 is a detail of the pivotal mounting of the front guard; Fig. 11 is a detail top plan view of the mounting of the lower plate of the rear wheel guard; Fig. 12 is the same of the front wheel guard; and Figs. 13 and 14 are detail views of the means for adjusting the height of the guard plate.

The main objects of the invention are, to provide a neat, durable, and efficient mud guard for automobiles and the like, which can be produced at a relatively low cost and will effectually prevent side splashing.

Further objects are, to provide a guard which can give so as not to be injured by contact with stones or other objects, can be easily and quickly mounted or demounted, and can be adjusted to suit circumstances.

This guard is more especially adapted to be used in combination with the usual fixedly mounted automobile mud guard, but may be used independently thereof, if desired, as will be apparent.

Referring to the drawings in detail, 1 designates the rear wheel of an automobile having its upper portion surrounded by the usual mud guard 2. A plate 3, of sheet metal, is cut to fit inside of guard 2, in front of wheel 1, and is supported thereby by being secured thereto by angle irons 4 riveted to the plate, and bolts 5 passed through the angle irons and mud guard and secured by wing nuts 6.

On the inner face of plate 3, at each side thereof and placed a short distance therefrom, vertical rods 7 are mounted. A rectangular plate 8 is slidably mounted on rod 7, by means of an integral sleeve 9 which travels on the back rod, and a sleeve 10 integral with an arm integral with plate 8, which travels on the front rod. At the front upper corner of plate 8 there is an integral, inwardly directed, properly braced arm 11 provided on its inner end with a forked head 12. Head 12 straddles the rim of a ring 13 which is detachably secured to the spokes of the wheel, concentric with the hub thereof. By this arrangement, plate 8 is maintained in fixed vertical relation to the wheel, and is not affected by the springing or vertical movement of the guard 2 and plate 3, and is kept properly spaced away from the wheel.

Plate 8 is provided, on its inner face, at each end thereof, with a pair of vertically alined sleeves 14 adapted to receive rods 15 secured to the outer face of the neck 16 of the guard plate 17, near the upper end thereof, and slightly spaced therefrom. A narrow slotted plate 18 has its upper end fixedly secured to the center of the lower edge of plate 8 and extending down the center of the neck of the guard plate. Binding screws 19 are passed through the slot of this plate and threaded into the guard plate, so as to bind them tightly against the sides of the former. By this means, the guard plate can be adjusted vertically and secured in fixed relation to plate 8. The lower portion of guard plate 17 is shaped to extend a little beyond the lower back portion of wheel 1, for the greater part thereof, downwardly. The front crossing of the plate is rounded and the plate is adjusted so as to be a very slight distance above the ground. It is held in this position by reason of its connection to plate 8, the adjustment of which has been explained. A rigid piece 20, of angle iron, is riveted to the outer face of plate 17, a slight distance above the front lower corner thereof, for a purpose to be presently disclosed.

When the guard is in position, as in Fig. 1, plate 17 effectually prevents any side splashing or the throwing of mud and dirt from centrifugal force, as is obvious. If the rounded corner of plate 17 strikes a stone or other obstacle, it will readily give upwardly, due to the sliding mounting of plate 8. In case the vehicle runs too close to a curbstone, or the like, the piece 20 of angle iron will engage the curb at an angle and protect the plate 17 from injury. By this means, the guard is effectually protected from damage by ordinary causes. The guard plate may be readily removed by removing binding screws 19 and raising the plate sufficiently to disengage rods 15 from sleeves 14. To remove plate 3 it is only necessary to unscrew wing nuts 6 from bolts 5. Also, ring 13 may be easily and quickly mounted or demounted, as will be evident from Fig. 9. From the above it will be seen that the guard may be easily and quickly assembled or taken apart, or mounted or demounted, and is easily accessible for cleaning, repairing, and like purposes. Further, the construction is very simple and of small cost.

The guard for the front wheel is practically the same as that for the back wheel, with the exception of a few necessary variations in details. The front wheel $1^a$ has to be turned, for guiding purposes. For this reason, it is necessary to mount the guard pivotally. The plate $3^a$ is pivotally connected by an integral lug $3^b$ to the center of the top of the front mud guard $2^a$. The arm 11 is replaced by two arms $11^a$, one provided with a forked head $12^a$ which straddles the rim of ring 13, and the other having a flat head $12^b$ which bears against the outer edge of the ring. These arms are spaced approximately 90° apart, and coöperate to keep the guard parallel with the wheel, and keep it spaced therefrom. A lug $3^c$ is secured to the lower back corner of plate $3^a$ and is loosely secured through one end of a connecting rod $3^d$ which passes underneath the body of the automobile and has its other end secured on a similar lug, on the guard of the other front wheel. By this construction, whenever one guard is shifted, the other guard will be shifted similarly and in the same direction. The plate $3^a$, of the front guard, is of proper shape and size to be properly operable under the guard $2^a$. With the above exceptions, the construction and operation of the front guard is identical with that of the rear one.

It is thought that the construction, operation, and use of the invention will be clear from the preceding detailed description.

Changes may be made in the construction, arrangement, and disposition of the several parts of the invention without in any way departing from the field and scope of the same, and it is meant to include all such within this application wherein only a preferred form has been disclosed.

Having thus fully described my invention, what I claim as new and desire to secure by Letters Patent is:

1. In combination in a device of the character described, a wheel, a fixedly mounted mud guard concentric with the upper portion thereof, a plate detachably secured thereto at the side of the said wheel, a second plate vertically slidable on the inner face thereof, a ring detachably mounted on the wheel concentric with the hub thereof, an inwardly presented arm integral with the second mentioned plate and provided with a forked head adapted to straddle the rim of the said ring, a vertically adjustable guard plate detachably mounted on the inner face of the second mentioned plate, and means for adjusting the guard plate vertically and securing it in adjustment.

2. In combination in a device of the character described, a wheel, a fixedly mounted mud guard concentric with the upper portion thereof, a plate detachably secured thereto at the side of the said wheel, a second plate vertically slidable on the inner face thereof, a ring detachably mounted on the wheel concentric with the hub thereof, an inwardly presented arm integral with the second mentioned plate and provided with a forked head adapted to straddle the rim of the said ring, a vertically adjustable guard plate detachably mounted on the inner face of the second mentioned plate, and means for adjusting the guard plate vertically and securing it in adjustment, such means being fixedly secured to the said second mentioned plate.

3. In combination in a device of the character described, a wheel, a plate mounted at the side thereof, supporting means therefor, a second plate slidably mounted on the inner face of the first mentioned plate, a ring detachably mounted on the wheel concentric with the hub thereof, an inwardly presented arm integral with the second mentioned plate and provided with a forked head adapted to straddle the rim of the said ring, a vertically adjustable guard plate detachably mounted on the inner face of the second mentioned plate, and means for adjusting the said guard plate vertically and securing it in adjustment, said means being fixedly secured to the second mentioned plate.

In witness whereof I have hereunto set my hand in the presence of two witnesses.

NAPOLEON MARION.

Witnesses:
A. PIPPOCOLO,
HENRY H. BABCOCK.